United States Patent [19]

Joslyn et al.

[11] Patent Number: 4,739,902
[45] Date of Patent: Apr. 26, 1988

[54] CONTAINER FOR STORING AND DISPENSING PAPER ARTICLES

[75] Inventors: Daniel V. Joslyn, Sheboygan, Wis.; Neale D. Rees, Battle Creek, Mich.

[73] Assignee: Rockline, Inc., Sheboygan, Wis.

[21] Appl. No.: 45,755

[22] Filed: Apr. 28, 1987

Related U.S. Application Data

[63] Continuation of Ser. No. 826,212, Feb. 5, 1986, abandoned.

[51] Int. Cl.⁴ ............................................. B65H 3/00
[52] U.S. Cl. ...................................... 221/37; 221/40; 221/210; 221/259
[58] Field of Search ................... 221/37, 210, 33, 36, 221/39, 40, 259

[56] References Cited

U.S. PATENT DOCUMENTS

```
1,205,892 11/1916 Hecht .
1,730,126 10/1929 Dailey .
2,032,150  2/1936 Richardson .
2,071,981  2/1937 Landsiedel .
2,269,525  1/1942 Fleischer .
2,284,071  5/1942 Sayles .
2,341,794  2/1944 Kliwer .
2,885,112  5/1959 Willat ............................ 221/210 X
3,065,878 11/1962 Behrens et al. .
3,094,323  6/1963 Catania .
3,204,817  9/1965 Kostering .
3,276,622 10/1966 Krzyzanowski .
4,093,297  6/1978 Reiber ............................ 221/259 X
4,121,726 10/1978 Pemberton .
4,214,673  7/1980 Heath et al. ....................... 221/259
4,269,324  5/1981 Hausam ............................ 221/36
4,401,233  8/1983 Frey .
4,574,952  3/1986 Masui ............................. 221/37 X
4,595,502  6/1986 Himmelsbach .
```

Primary Examiner—Joseph J. Rolla
Assistant Examiner—Gregory L. Huson
Attorney, Agent, or Firm—Andrus, Sceales, Starke & Sawall

[57] ABSTRACT

A container (10) for storing and dispensing a stack of paper articles (30) is provided with a bottom wall (12), at least one side wall (14) and a top wall (22). The top wall has a struck out hinged pivotable portion (32) which is pivotable into and out of the container. That portion of the top wall which is not pivotable retains the stack within the container. A depressible hinged tab (38) is struck out of the hinged pivotable portion, and has an adhesive (42) on its underside. When the tab is depressed, thus engaging the side wall of the topmost article in the stack, and the pivotable hinged portion is subsequently lifted, the topmost article in the stack is lifted for one-at-a-time dispensing of the articles from the stack.

12 Claims, 1 Drawing Sheet

U.S. Patent   Apr. 26, 1988   4,739,902
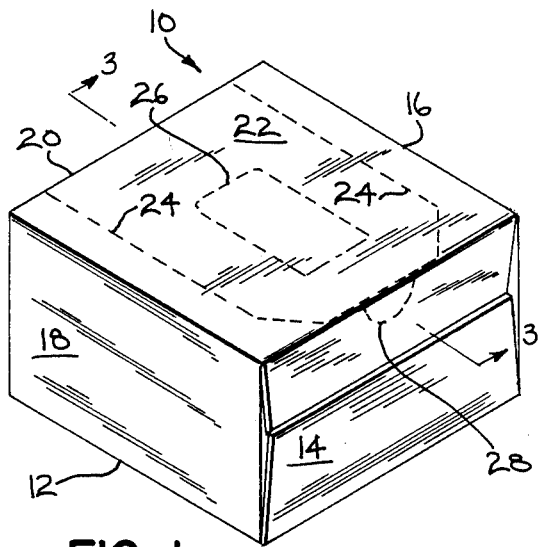
FIG. 1
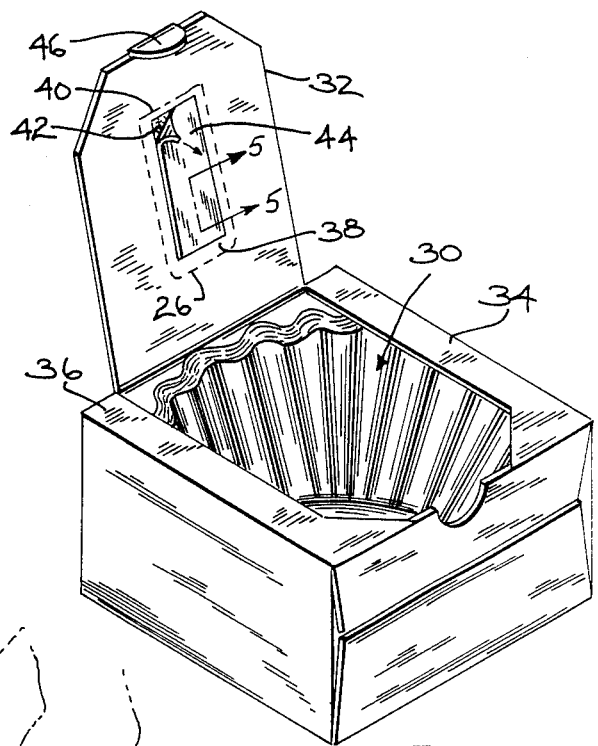
FIG. 2
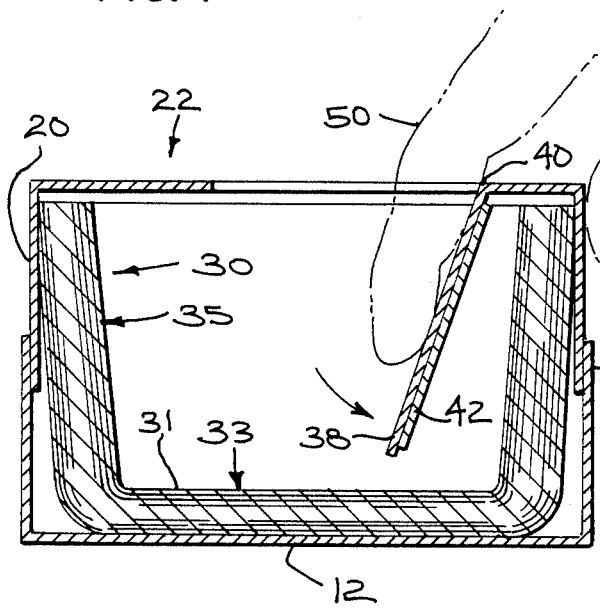
FIG. 3
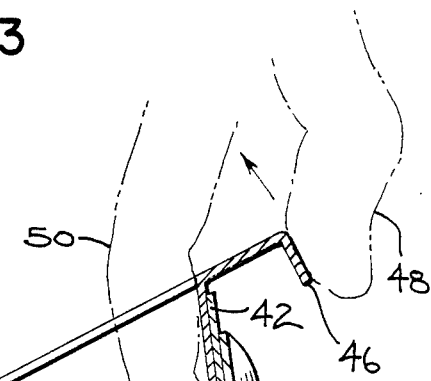
FIG. 4
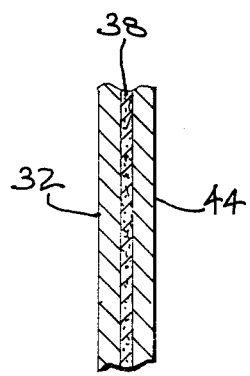
FIG. 5
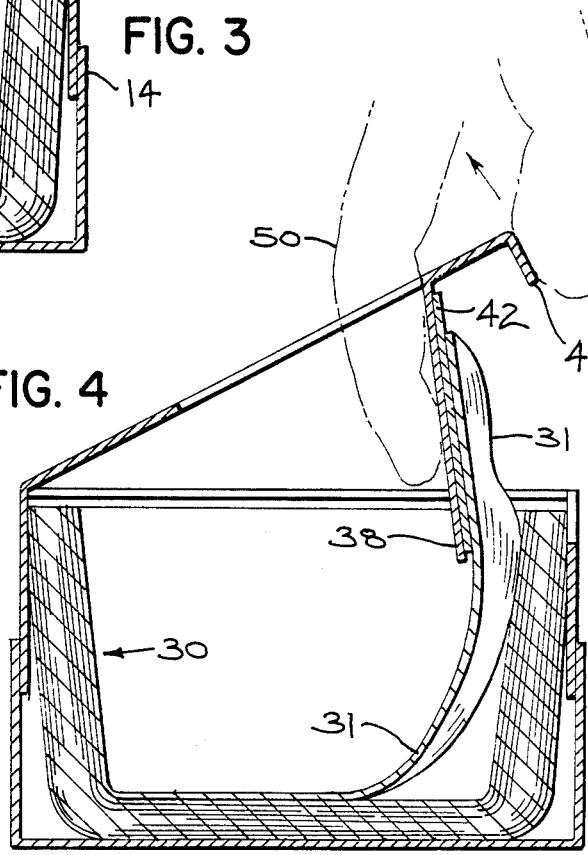

CONTAINER FOR STORING AND DISPENSING PAPER ARTICLES

This is a continuation of co-pending application Ser. No. 06/826,212 filed Feb. 5, 1986, now abandoned.

BACKGROUND AND SUMMARY OF THE INVENTION

This invention relates to containers for storing a stack of paper articles, and particularly to containers which have a feature for dispensing the articles therefrom. More specifically, this invention is useful for dispensing cupuliform paper filters for automatic drip coffee makers and the like.

Containers for storing a stack of paper articles are well known, some of which contain a feature or mechanism for dispensing the stored articles. One such container is shown in U.S. Pat. No. 2,269,525 to Fleischer. The Fleischer patent shows a container with a hinged lid, for storing and dispensing carbon paper. The pivotable portion of the lid is provided with a tab having adhesive on its underside to adhere to the topmost sheet of carbon paper. When the tab is depressed, thus engaging the topmost sheet, and the pivotable portion of the lid is subsequently lifted, the topmost sheet is lifted therewith to dispense the sheet from the stack.

A drawback to the construction shown in the Fleischer patent is the inability of the container to maintain the position of the stack of articles when the topmost article is dispensed. This can be troublesome when the articles in the stack tend to stick together, e.g. by electrostatic forces. Additionally, if the container is inadvertently dropped or inverted, there is nothing to prevent the contents from spilling out.

It is an object of the present invention to provide a container for storing a stack of paper articles such as cup-shaped coffee filters, and for dispensing the articles in a one-at-a-time manner therefrom. It is a further object of the invention to provide such a container which retains the stack of articles therein during dispensing, as well as at times when the container and stack are dropped or inadvertently inverted. It is yet another object of the invention to dispense the articles without ripping or damaging them in any way.

In accordance with one aspect of the invention, a container is provided with a bottom wall, at least one side wall, and a top wall.

In accordance with another aspect of the invention, the top wall is provided with a struck out hinged portion which is pivotable into and out of the container with respect to the remainder of the top wall. That portion of the top wall which is not pivotable acts to retain the stack of articles within the container during dispensing and in case the container is dropped or inverted.

In accordance with yet another aspect of the invention, a depressible hinged tab is struck out from and pivotable relative to the pivotable hinged portion of the top wall.

In accordance with yet another aspect of the invention, an adhesive means is disposed on the underside of the depressible hinged tab. When the hinged portion of the top wall is pivoted into the container and the tab is depressed so as to come in contact with the topmost article, the adhesive means adheres to said article. When the hinged portion is pivoted out of the container the topmost article is lifted by the tab through the top wall for one-at-a time dispensing of the articles from the stack. Since the means used to engage the topmost article is an adhesive rather than a mechanical means, the dispensing is accomplished with little chance for damage to the articles. In the case of cup-shaped articles, the side wall of the article is engaged by the tab and the article is lifted thereby through the opening in the top wall of the container.

BRIEF DESCRIPTION OF THE DRAWINGS

The accompanying drawings illustrate the best mode presently contemplated by the inventor for carrying out the invention.

In the drawings:

FIG. 1 is a perspective view of a container constructed according to the invention, the box being shown in its closed position;

FIG. 2 is a perspective view showing the container with the hinged pivotable portion raised out of the container;

FIG. 3 is a sectional view taken generally along line 3—3 of FIG. 1, showing the hinged tab being depressed for engagement with the topmost article in the stack;

FIG. 4 is a view similar to FIG. 3, showing the topmost article being lifted for removal from the container;

FIG. 5 is a sectional view taken along line 5—5 of FIG. 2.

Description of the Preferred Embodiment

As shown in the drawings, a container 10 is provided for storing a stack of articles. Container 10 has a bottom wall 12, front wall 14, right side wall 16, left side wall 18, rear wall 20, and a top wall 22. Container 10 is particularly useful for storing and dispensing cupuliform articles such as a stack of paper coffee filters. When storing such articles, container 10 is preferably square in plan, to accommodate the circular shape of the filters.

As shown in FIG. 1, top wall 22 is provided with perforations 24 and 26. Front wall 14 is provided with perforations 28. Perforations 24, 26, and 28 define the operative components of the present invention, which will be described hereinafter.

FIGS. 2 and 3 show a nested stack 30 of cupuliform paper articles stored within container 10. The cupuliform articles in stack 30 each have a bottom surface 33 and a side wall 35. Nested stack 30 fits snugly within cntainer 10, and the top of stack 30, as formed by side walls 35 of the cupuliform articles, is in close proximity with top wall 22 of container 10. Cupuliform article 31 is the topmost article in nested stack 30.

Referring to FIGS. 1 and 2, portion 32 is struck out of top wall 22 along perforations 24 when it is desired to dispense articles from container 10. Portion 32 of top wall 22 is hinged at the point where rear wall 20 intersects top wall 22. Hinged portion 32 is pivotable into and out of container 10 with respect to that portion of top wall 22 which remains after hinged pivotable portion 32 is struck out therefrom. The remaining portions of top wall 22 are right retaining portion 34 and left retaining portion 36. Portions 34 and 36 extend along the periphery of top wall 22 adjacent to side walls 16 and 18, and serve to retain stack 30 within container 10. The retaining function performed by right retaining portion 34 and left retaining portion 36 is especially important in the event container 10 is accidentally dropped or inverted when open.

When perforations 26 are struck out, a depressible hinged tab 38, best shown in FIG. 3, is formed. Tab 38 is constructed so as to pivot about a line 40 where the tab joins with hinged pivotable portion 32.

Tab 38 is provided with adhesive means on its underside. In this embodiment, the adhesive means is shown as a two-sided strip 42 of adhesive. One side of adhesive strip 42 is adhered to the underside of tab 38, and the other side of strip 42 is covered by a removable preserving and protecting means 44. See FIG. 2. When it is desired to dispense the articles in stack 30 from container 10, the preserving and protecting means 44 is removed from adhesive strip 42 in order to expose the adhesive.

Pivotable hinged portion 32 is provided with a manually engageable semicircular tab 46 struck out of front side wall 14 along perforations 28. The functioning of semicircular tab 46 will be detailed below.

In operation, when it is desired to dispense the cupuliform articles in stack 30 from container 10, hinged pivotable portion 32 is struck out of top wall 22 along perforations 24. At the same time, semicircular tab 46 is struck out of front wall 14 along perforations 28. Depressible hinged tab 38 is then struck out of hinged portion 32 along perforations 26. The preserving and protecting means 44 is then removed from adhesive strip 42.

To dispense topmost article 31, the operator pivots hinged pivotable portion 32 to its closed position. If desired, the operator may depress hinged pivotable portion 32 even further, so that hinged pivotable portion 32 is actually inside container 10. The operator engages thumb 48 with semicircular tab 46 and uses finger 50 to depress tab 38. The operator continues to depress tab 38 until adhesive strip 42 comes into contact with side wall 35 of topmost article 31 and adheres thereto. The operator then relieves the pressure being exerted on tab 38, and lifts hinged pivotable portion 32 out of container 10, as shown in FIG. 4. Topmost article 31 is lifted by its side wall 35, along with hinged pivotable portion 32. The operator continues lifting hinged pivotable portion 32 out of container 10 until topmost article 31 has passed through the passage or opening defined by retaining portions 34 and 36 of top wall 22. The operator then removes uppermost article 31 from adhesive strip 42 for use.

Container 10 may be used to dispense any type of article from a stack of articles stored therein, and is not necessarily limited to use with cupuliform articles.

Container 10 is preferably constructed of a rigid or semi-rigid paperboard material to facilitate ease of manufacture and construction. Container 10 is formed from a flat sheet of such material which has the top, bottom, and side walls of container 10 cut out from a blank. The flat sheet from which container 10 is formed also has perforations 24, 26, and 28 stamped out, which define hinged pivotable portion 32, tab 38, and semi-circular tab 46. When it is desired to construct container 10, a sequence of folding and assembling steps is undertaken whereby the cut and stamped flat sheet is converted into container 10. Stack 30 of cupuliform articles is inserted into container 10 just prior to final assembly of container 10, after which assembly of the container is completed. In this manner, container 10 is inexpensively and efficiently produced, with a minimal number of steps necessary to arrive at the completed product.

Various modes of carrying out the invention are contemplated as being within the scope of the following claims particularly pointing out and distinctly claiming the subject matter which is regarded as the invention.

I claim:

1. A container for storing a stack of articles and for dispensing said articles in a one-at-a-time manner, said container comprising:
   a bottom wall, a plurality of side walls, and a top wall;
   said top wall having a struck out hinged portion which is pivotally attached to one of said side walls into and out of said container with respect to the remainder of said top wall, said remainder of said top wall forming retainer means for retaining said stack of articles within said container when said container is in either an upright or an inverted position;
   a depressible hinged tab struck out from and pivotable relative to said pivotable hinged portion of said top walls adjacent a second side wall opposite to said one of said side walls; and,
   adhesive means disposed on the underside of said tab so that when said pivotable hinged portion of said top wall is pivoted into said container and said tab is depressed into engagement with said stack, said adhesive means adheres to the topmost article in said stack of articles and so that subsequent lifting of said pivotable hinged portion of said top wall out of said container causes said topmost article to be lifted by said tab through said top wall.

2. The invention according to claim 1 wherein said retaining means formed by said remainder of said top wall comprises a portion of said top wall adjacent said side wall which extends at least partially along the periphery of said top wall.

3. The invention according to claim 1 which includes a manually engageable tab struck out of said second container side wall and integral with said hinged pivoting portion, to facilitate the lifting of said pivotable hinged portion of said top wall out of said container.

4. The invention according to claim 1 wherein said adhesive means comprises a two-sided strip of adhesive, one side of said strip being adhered to the underside of said depressible hinged tab, and the other side of said strip being covered by a removable preserving and protecting means.

5. The invention according to claim 1 wherein said container forms means to store a stack of cupuliform articles for dispensing therefrom in a one-at-a-time manner, said cupuliform articles having at least one side wall, and wherein said hinged tab, when depressed, adheres to said side wall of the topmost cupuliform article in said stack so that subsequent lifting of said pivotable hinged portion of said top wall out of said container causes said topmost cupuliform article to be lifted by its said side wall through said top wall.

6. The invention according to claim 5 wherein said retaining means formed by said remainder of said top wall comprises a portion of said top wall adjacent said side wall which extends at least partially along the periphery of said top wall, said portion of said top wall being in close proximity with the top of said side walls of said stack of cupuliform articles.

7. The invention according to claim 1 wherein said container is constructed of a paperboard material.

8. The invention according to claim 7 wherein said paperboard container is constructed from a flat sheet having said top wall, bottom wall, and side walls cut out therefrom, the edges of said pivotable hinged portion and said tab being defined by perforations so that said container may be assembled from said flat sheet and said stack of articles may be inserted therein before said container is completely assembled.

9. A container for storing a stack of articles and for dispensing said articles in a one-at-a-time manner, said container comprising:
   a bottom wall, a plurality of side walls and a top wall;
   said top wall having a struck out hinged portion which is pivotally attached to one of said side walls into and out of said container with respect to the remainder of said top wall, said remainder of said top wall forming retainer means for retaining said stack of articles within said container, said retainer means including a top wall portion disposed adjacent the top edge of said side wall and extending substantially around the entire periphery of said top wall surrounding said struck out hinged portion of said top wall;
   a depressible hinged tab struck out from and pivotable relative to said pivotable hinged portion of said top wall adjacent a second side wall opposite to said one of said side walls; and,
   adhesive means disposed on the underside of said tab so that when said pivotable hinged portion of said top wall is pivoted into said container and said tab is depressed into engagement with said stack, said adhesive means adheres to the top most article in said stack of articles and so that subsequent lifting of said pivotable hinged portion of said top wall out of said container causes said topmost article to be lifted by said tab through said top wall.

10. A container for storing a stack of articles and for dispensing said articles in a one-at-a-time manner, said container comprising:
    a bottom wall, a plurality of side walls, and a top wall;
    said top wall having a struck out hinged portion which is pivotally attached to one of said side walls into and out of said container with respect to the remainder of said top wall, said remainder of said top wall forming retainer means for retaining said stack of articles within said container, said retainer means being engageable with opposite sides of the top of said stack of articles and defining an opening between said opposite sides of said stack through which said articles pass during dispensing;
    a depressible hinged tab struck out from and pivotable relative to said pivotable hinged portion of said top wall adjacent a second side wall opposite to said one of said side walls; and,
    adhesive means disposed on the underside of said tab so that when said pivotable hinged portion of said top wall is pivoted into said container through said opening and said tab is depressed into engagement with said stack, said adhesive means adheres to the topmost article in said stack of articles and so that subsequent lifting of said pivotable hinged portion of said top wall out of said container causes said topmost articles to be lifted by said tab through said opening.

11. A container for storing and dispensing a stack of articles and for dispensing said articles in a one-at-a-time manner, said container comprising:
    a bottom wall, a plurality of side walls, and a top wall;
    said top wall having a struck out hinged portion which is pivotally attached to one of said side walls into and out of said container with respect to the remainder of said top wall, said remainder of said top wall forming retainer means for retaining said stack of articles within said container, said retainer means comprising a pair of opposed top wall portions disposed adjacent the top edge of said side wall;
    a depressible hinged tab struck out from and pivotable relative to said pivotable hinged portion of said top wall adjacent a second side wall opposite to said one of said side walls; and
    adhesive means disposed on the underside of said tab so that when said pivotable hinged portion of said top wall is pivoted into said container and said tab is depressed into engagement with said stack, said adhesive means adheres to the topmost article in said stack of articles and so that subsequent lifting of said pivotable hinged portion of said top wall out of said container causes said topmost article to be lifted by said tab through said top wall.

12. The invention according to claim 11, wherein said remainder of said top wall forms means for retaining said stack of articles within said container when said container is in either an upright or an inverted position.

* * * * *

UNITED STATES PATENT AND TRADEMARK OFFICE
CERTIFICATE OF CORRECTION

PATENT NO. : 4,739,902

DATED : April 26, 1988

INVENTOR(S) : Daniel V. Joslyn et al

It is certified that error appears in the above-identified patent and that said Letters Patent is hereby corrected as shown below:

Column 2, line 47, "cntainer" should read --container--.

Claim 9, column 5, line 6, after "side walls" insert --,--. (comma)

Signed and Sealed this

Eleventh Day of April, 1989

Attest:

DONALD J. QUIGG

Attesting Officer

Commissioner of Patents and Trademarks